United States Patent [19]

Hook

[11] Patent Number: 4,501,572
[45] Date of Patent: Feb. 26, 1985

[54] PROTECTIVE COVER ASSEMBLY FOR A GREASE FITTING

[75] Inventor: Wolfgang Hook, Viernheim, Fed. Rep. of Germany

[73] Assignee: Deere & Company, Moline, Ill.

[21] Appl. No.: 391,321

[22] Filed: Jun. 23, 1982

[30] Foreign Application Priority Data

Aug. 26, 1981 [EP] European Pat. Off. ......... 81303906.2

[51] Int. Cl.³ .............................................. F16D 3/84
[52] U.S. Cl. ..................................... 464/170; 74/609; 464/901
[58] Field of Search ............... 464/170, 171, 177, 901; 403/23, 286, 57; 74/608, 609, 612

[56] References Cited

U.S. PATENT DOCUMENTS

| 1,679,700 | 8/1928 | Wysong | 464/170 X |
| 2,106,672 | 1/1938 | Wollner | 464/171 X |
| 2,984,090 | 5/1961 | Bennett | 464/170 X |
| 3,504,508 | 4/1970 | Bornzin | 464/171 |
| 4,324,533 | 4/1982 | Schroeder et al. | 464/170 X |

FOREIGN PATENT DOCUMENTS 486251 9/1952 Canada ............................... 464/171
1007542 5/1957 Fed. Rep. of Germany ...... 464/171

Primary Examiner—Stuart S. Levy
Assistant Examiner—Daniel P. Stodola

[57] ABSTRACT

A protective cover assembly is disclosed for a grease fitting formed on the universal joint of a Cardan shaft. The assembly includes a cover plate, a support member and a slideable sleeve. The cover plate projects outward from a gear case and encircles a portion of the Cardan shaft which is connected between the gear case and a transmission. The support member straddles the cover plate and is attached to the gear case such that it encircles a portion of the Cardan shaft and is aligned adjacent to the universal joint. The support member has a stepped outer surface with a radially aligned attachment mechanism formed on the smaller diameter surface. The slideable sleeve protrudes onto the smaller diameter surface and the attachment mechanism cooperates with a mating surface on the sleeve to form a quick attachable and releaseable fit between the two parts. When the sleeve is secured to the support member, the universal joint is completely enclosed and protected from contamination and when it is necessary to lubricate the universal joint, the sleeve is slid back thereby exposing the grease fitting.

3 Claims, 2 Drawing Figures

PROTECTIVE COVER ASSEMBLY FOR A GREASE FITTING

FIELD OF THE INVENTION

This invention relates to a protective cover assembly for a grease fitting and more particularly to a protective cover assembly for a greese fitting formed on the universal joint of a Cardan shaft.

BACKGROUND OF THE INVENTION

Many agricultural and industrial vehicles, especially front wheel drive tractors, use a Cardan shaft to transmit torque between a transmission and a gear case. A Cardan shaft includes a universal joint and it is common practice to provide a protective shield over this joint to protect it from contamination and from being damaged. One such shield currently being used is a hollow tube which is fixed to the gear case so as to be stationary. The hollow tube contains an access hole through which the nozzle of a grease gun can pass to grease the nipple on the universal joint. Although the access hole is correctly positioned in the axial direction, the grease nipple can only be reached when the Cardan shaft has the correct rotational position such as to align the grease nipple radially with the access hole. Since the Cardan shaft is permanently coupled to the differential gear case, the only available way to achieve alignment is for the operator to inch the vehicle along while a second person peers through the access hole until it is aligned with the grease nipple. The vehicle is then stopped and the universal joint is lubricated. Although this procedure can be and is followed, it is highly inconvenient and necessitates two people to perform a simple operation.

Now a protective cover assembly has been invented which overcomes the drawbacks of the prior art.

SUMMARY OF THE INVENTION

Briefly, this invention relates to a protective cover assembly for a grease fitting formed on a universal joint when the universal joint is part of a Cardan shaft which transmits torque between a transmission and a gear case. The assembly includes a cover plate which projects out from the gear case and encircles a portion of the Cardan shaft. A support member straddles the cover plate and is attached to the gear case such that it encircles the Cardan shaft and is adjacent to the universal joint. The support member has a stepped outer surface with a radially aligned attachment mechanism formed on the smaller diameter surface. This smaller diameter surface receives a slideable sleeve while the attachment mechanism cooperates with a mating surface on the slideable sleeve to form a quick attachable and releaseable fit between the two parts. When the sleeve is secured to the support member, the universal joint is completely enclosed and protected from contamination and when it is necessary to lubricate the universal joint, the sleeve is slid back thereby exposing the grease fitting. This invention permits the universal joint to be lubricated by one person irregardless of the position of the grease nipple relative to the protective sleeve.

The general object of this invention is to provide a protective cover assembly for a grease fitting formed on a universal joint when the joint is part of a Cardan shaft. A more specific object of this invention is to provide a protective cover assembly for a universal joint on a Cardan shaft which can be quickly removed to permit lubrication of the joint.

Another object of this invention is to provide a protective cover assembly for a universal joint on a Cardan shaft which will permit easy lubrication of the joint without the need to align the grease nipple with an access hole.

Still further, an object of this invention is to provide a simple and economical protective cover assembly for a grease fitting which is formed on the joint of a Cardan shaft.

Other objects and advantages of the present invention will become more apparent to those skilled in the art in view of the following description and the accompanying drawings.

DETAILED DESCRIPTION OF THE PREFERRED EMBODIMENT

Figure 1:
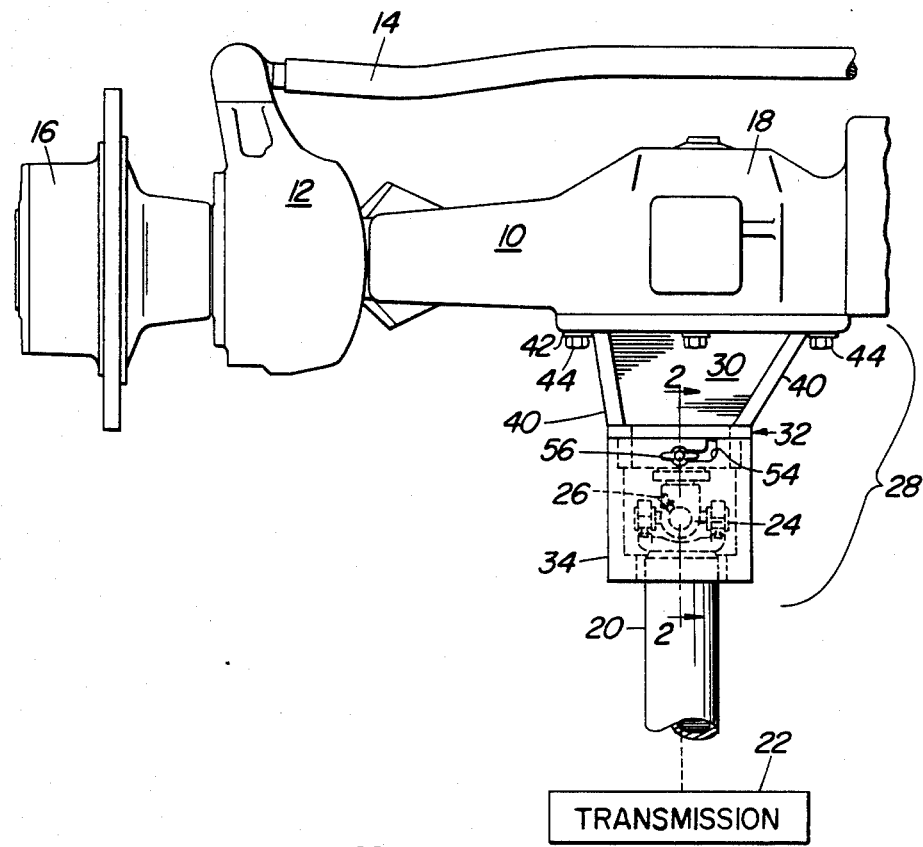
FIG. 1 is a plan view of a protective cover assembly enclosing the universal joint formed on a Cardan shaft which connects a transmission to a gear case.

Referring to FIG. 1, a front axle casing 10 is shown having a steering knuckle 12 which is steerable via a track rod 14 and which carries a wheel hub 16. The axle casing 10 is integral with a differential gear case 18 which contains bevel gears (not shown) for transmitting torque from a perpendicularly arranged Cardan shaft 20 to the front wheels. The Cardan shaft 20 transmits torque from a transmission 22 to the bevel gears enclosed in the gear case 18. The Cardan shaft 20 is able to tolerate misalignment of its opposite ends by the presence of a universal joint 24. The universal joint 24 has a conventional grease fitting or nipple 26 which is designed to receive the nozzle of a grease gun such that grease can be forced into the universal joint 24 to lubricate the enclosed needle bearings.

Figure 2:
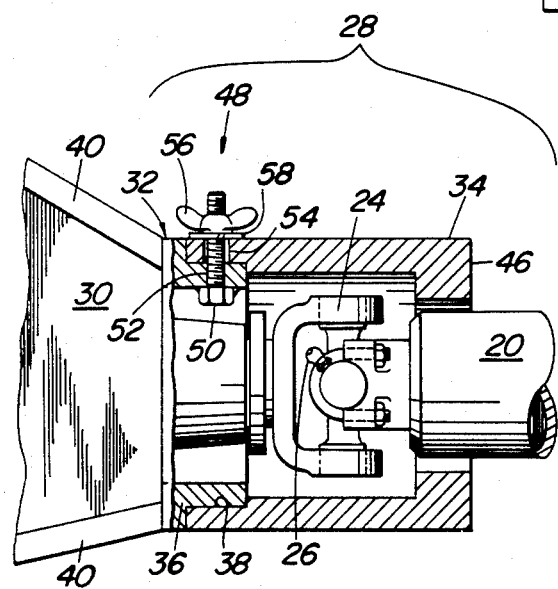
FIG. 2 is a partial cross-sectional view of the sleeve positioned on the support member and attached thereto.

The universal joint 24 is protected from contamination by a cover assembly 28, see FIGS. 1 and 2, which includes a cover plate 30, a support member 32 and a sleeve 34. The cover plate 30 encircles one end of the gear case 18 and projects rearward towards the transmission 22. The support member 32 has a stepped flange 36 with a smaller diameter surface 38 positioned adjacent to the universal joint 24. Extending forward from the larger diameter portion of the flange 36 are a plurality of circumferentially spaced legs 40, two of which are shown in the figures. The legs 40, of which there are preferably three or four, diverge forward so as to straddle the cover plate 30. The forward end of each leg 40 is bent out to form a lug 42 through which a bolt 44 can pass. Preferably, the same bolts 44 can fix both the cover plate 30 and the support member 32 to the gear casing 18. The support member 32 is thus held stationary and is permanently attached to the gear case 18, except when major disassembly is performed.

The sleeve 34, which encircles the Cardan shaft 20, is slideable onto the smaller diameter surface 38 of the support member 32 such that the universal joint 24 is completely enclosed. The sleeve 34 is stepped in configuration and has an outer apertured end wall 46 which fits closely around the Cardan shaft 20 to prevent the ingress of dirt. However, enough clearance is provided to accommodate the movement of the Cardan shaft 20. Preferably, the outer end 46 of the sleeve 34 can contain a flexible rubber bushing which provides the necessary stepped profile while permitting movement of the Cardan shaft 20 within the sleeve 34.

The sleeve 34 is releasably attached to the support member 32 by a quick attachment mechanism 48. As shown in FIG. 2, the attachment mechanism 48 consists of a threaded bolt 50 projecting radially outward through an aperture 52 formed in the smaller diameter surface 38. The bolt 50 is preferably welded or otherwise attached to an inner surface of the support member 32 to retain it in place. The sleeve 34 contains an L-shaped slot 54, best seen in FIG. 1, which will receive the threaded stud portion of the bolt 50 along the manner of a bayonet connection. Rotation of the sleeve 34 permits the bolt 50 to move along the base leg of the L-shaped slot 54. The sleeve 34 may be released from the support member 32 by a reverse movement and then slid back along the Cardan shaft 20 to expose the grease nipple 26 for easy servicing, irrespective of the radial direction along which the grease nipple 26 happens to lie.

In order to obtain a secure quick release attachment, a nut 56 is tightened onto the threaded bolt 50. As illustrated, the nut 56 can be a wing nut thereby avoiding the need of a wrench to tighten or release it. A lock washer 58 can also be utilized under the nut 56. Although a single bolt 50 and slot 54 are shown, there may be a plurality of these spaced around the periphery of the cover assembly 28 to ensure reliable fitting. Other means of fixing the sleeve 34 on the support member 32 can be employed provided they are secure yet easy to release. Straight axial slots instead of the L-shaped slots 54 can be used, preferably with the inner end of the slots recessed to receive the nut 56 so that the sleeve 34 is positively and not merely frictionally restrained. Also, the support member 32 and the sleeve 34 may have complimentary screw threads.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A protective cover assembly for a grease fitting formed on a universal joint, said universal joint being part of a Cardan shaft which is capable of transmitting torque between a transmission and a gear case, said protective cover assembly comprising:
    (a) a cover plate projecting outward from said gear case and encircling a portion of said Cardan shaft;
    (b) a support member including a flange having a stepped outer surface with a radially aligned aperture formed in a smaller diameter surface and having three equally spaced apart legs which extend outward from said flange toward said gear case, said legs straddling said cover plate and being attached to said gear case such that when said support member is attached to said gear case, said smaller diameter surface encircles a portion of said Cardan shaft and is located adjacent to said universal joint;
    (c) a one-piece tubular sleeve having a first end slidably positioned onto said smaller diameter surface of said support member in a direction axially of said Cardan shaft to completely cover said universal joint, and having a second end with a smaller diameter aperture formed therein through which said Cardan shaft passes, said sleeve further having an L-shaped slot extending inward from said first end whereby the base leg of said L-shaped slot is aligned with said aperture formed in said support member when said sleeve is fully positioned on said flange; and
    (d) a single attachment device extending upward through said aperture formed in said support member and through said L-shaped slot formed in said sleeve for releasably securing said sleeve to said support member whereby said grease fitting is protected from contamination when said sleeve is secured to said support member and whereby access is provided to said grease fitting when said sleeve is released and slid back away from said support member irrespective of the radial direction along which said grease fitting happens to lie.

2. The protective cover assembly of claim 1 wherein said cover plate, support member, and sleeve are held stationary to said gear case while protecting said revolving universal joint.

3. A protective cover assembly for a grease fitting formed on a universal joint, said universal joint being part of a Cardan shaft which is capable of transmitting torque between a transmission and a gear case, said protective cover assembly comprising:
    (a) a stationary cover plate projecting outward from said gear case and encircling a portion of said Cardan shaft;
    (b) a stationary support member including a flange having a stepped outer surface with a radially aligned aperture formed in a smaller diameter surface thereof and at least two legs extending outward from said flange toward said gear case, said legs straddling said cover plate and being attached to said gear case whereby said smaller diameter surface encircles a portion of said Cardan shaft and is located adjacent to said universal joint;
    (c) a one-piece sleeve encircling a portion of said Cardan shaft and being slidable onto said smaller diameter surface of said flange in a direction axially of said Cardan shaft to completely cover said universal joint, said sleeve having an L-shaped slot extending inward from one end whereby the base leg of said L-shaped slot is aligned with the aperture formed in said support member when said sleeve is fully positioned on said flange, said sleeve further having a second end which closely encircles a portion of said Cardan shaft on an opposite side of said universal joint; and
    (d) a bolt extending through said aperture formed in said support member and through said L-shaped slot formed in said sleeve and receiving a nut for releasably securing said sleeve to said support member to protect said grease fitting from contamination and whereby said sleeve can be released from said flange and slid back away from said universal joint to permit lubrication of said grease fitting irrespective of the radial direction along which said grease fitting happens to lie.

* * * * *